(12) United States Patent
Fitzer et al.

(10) Patent No.: US 10,942,723 B2
(45) Date of Patent: *Mar. 9, 2021

(54) FORMAT FOR MULTI-ARTEFACT SOFTWARE PACKAGES

(71) Applicant: SAP SE, Walldorf (DE)

(72) Inventors: Joachim Fitzer, Schriesheim (DE); Pietro Francesco Menna, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,453

(22) Filed: Apr. 5, 2019

(65) Prior Publication Data

US 2020/0319871 A1    Oct. 8, 2020

(51) Int. Cl.
*G06F 8/61*  (2018.01)
*G06F 8/73*  (2018.01)
*G06F 8/41*  (2018.01)

(52) U.S. Cl.
CPC ............... *G06F 8/64* (2013.01); *G06F 8/433* (2013.01); *G06F 8/73* (2013.01)

(58) Field of Classification Search
CPC ............... G06F 8/64; G06F 8/433; G06F 8/73
See application file for complete search history.

(56) References Cited

U.S. PATENT DOCUMENTS

| | | | |
|---|---|---|---|
| 6,356,915 B1 | 3/2002 | Chtchetkine et al. | |
| 7,620,948 B1 * | 11/2009 | Rowe ..................... | G06F 8/65 717/171 |
| 7,636,722 B2 | 12/2009 | Bunker et al. | |
| 7,769,794 B2 | 8/2010 | Moore et al. | |
| 10,169,347 B2 | 1/2019 | Jayachandran et al. | |
| 10,809,994 B1 | 10/2020 | Fitzer et al. | |
| 2004/0189707 A1 | 9/2004 | Moore et al. | |
| 2004/0193594 A1 | 9/2004 | Moore et al. | |
| 2004/0193621 A1 | 9/2004 | Moore et al. | |
| 2004/0193672 A1 | 9/2004 | Samji et al. | |
| 2004/0193673 A1 | 9/2004 | Samji et al. | |
| 2004/0230599 A1 | 11/2004 | Moore et al. | |
| 2005/0246331 A1 | 11/2005 | De Vorchik et al. | |
| 2006/0036568 A1 | 2/2006 | Moore et al. | |

(Continued)

OTHER PUBLICATIONS

"U.S. Appl. No. 16/376,305, Examiner Interview Summary dated Jun. 4, 2020", 3 pgs.

(Continued)

*Primary Examiner* — Ziaul A Chowdhury
(74) *Attorney, Agent, or Firm* — Schwegman Lundberg & Woessner, P.A.

(57) ABSTRACT

In an example embodiment, a solution is used to provide for a highly efficient application installer. A software packaging format, known as vSolution, is provided that allows software developers to ship multiple artefacts of different types in a single container. Unlike traditional mechanisms, this container does not contain a dedicated installer executable or any sort of installation routine. Rather, the container format encourages a declarative approach to describe what an installation routine should perform, via the organization of the artefacts based on content type and using a naming convention.

20 Claims, 8 Drawing Sheets

(56) References Cited

U.S. PATENT DOCUMENTS

| | | | |
|---|---|---|---|
| 2007/0067349 A1 | 3/2007 | Jhaveri et al. | |
| 2007/0245257 A1 | 10/2007 | Chan et al. | |
| 2009/0157627 A1 | 6/2009 | Arthursson | |
| 2009/0305778 A1* | 12/2009 | Yu | G06F 8/65 463/29 |
| 2011/0119634 A1 | 5/2011 | Bhatt et al. | |
| 2012/0198559 A1 | 8/2012 | Venkata | |
| 2014/0248002 A1* | 9/2014 | Thakkar | H04N 21/6125 382/305 |
| 2015/0128105 A1* | 5/2015 | Sethi | G06F 8/36 717/106 |
| 2015/0261774 A1 | 9/2015 | Mcferrin et al. | |
| 2015/0261782 A1 | 9/2015 | Mcferrin et al. | |
| 2015/0261971 A1 | 9/2015 | Mcferrin et al. | |
| 2015/0268948 A1 | 9/2015 | Plate | |
| 2016/0378348 A1 | 12/2016 | Uriel | |
| 2016/0378676 A1 | 12/2016 | Uriel | |
| 2017/0048079 A1 | 2/2017 | Nethi et al. | |
| 2017/0075675 A1* | 3/2017 | Babol | G06F 8/64 |
| 2017/0206071 A1* | 7/2017 | Kirkpatrick | G06F 8/61 |
| 2017/0344292 A1 | 11/2017 | Sterin et al. | |
| 2017/0364342 A1 | 12/2017 | Shuster et al. | |
| 2018/0027006 A1 | 1/2018 | Zimmermann et al. | |
| 2018/0027070 A1 | 1/2018 | Jhanji et al. | |
| 2018/0129479 A1 | 5/2018 | Mcpherson et al. | |
| 2018/0129803 A1 | 5/2018 | Levin et al. | |
| 2018/0196654 A1* | 7/2018 | Bo | G06F 9/455 |
| 2018/0211029 A1 | 7/2018 | Ryu et al. | |
| 2018/0293066 A1 | 10/2018 | Ali et al. | |
| 2018/0295059 A1 | 10/2018 | Gamage | |
| 2018/0341471 A1 | 11/2018 | Stefanov et al. | |
| 2018/0356964 A1 | 12/2018 | Morris | |
| 2018/0357068 A1 | 12/2018 | Ambichl et al. | |
| 2019/0004779 A1 | 1/2019 | Schmidt et al. | |
| 2019/0026474 A1 | 1/2019 | Adam et al. | |
| 2019/0042286 A1 | 2/2019 | Bailey et al. | |
| 2019/0095179 A1* | 3/2019 | Straub | G06F 16/182 |
| 2019/0173949 A1 | 6/2019 | Inomata et al. | |
| 2019/0227794 A1* | 7/2019 | Mercille | G06F 9/45504 |
| 2019/0235900 A1 | 8/2019 | Singh et al. | |
| 2019/0272224 A1 | 9/2019 | Woods | |
| 2019/0324786 A1 | 10/2019 | Ranjan et al. | |
| 2019/0349402 A1 | 11/2019 | Shukla et al. | |
| 2020/0019410 A1 | 1/2020 | Dima et al. | |
| 2020/0034745 A1 | 1/2020 | Nagpal et al. | |
| 2020/0319869 A1 | 10/2020 | Fitzer et al. | |
| 2020/0319870 A1 | 10/2020 | Fitzer et al. | |
| 2020/0320041 A1 | 10/2020 | Fitzer et al. | |
| 2020/0320042 A1 | 10/2020 | Fitzer et al. | |

OTHER PUBLICATIONS

"U.S. Appl. No. 16/376,305, Non Final Office Action dated Feb. 21, 2020".

"U.S. Appl. No. 16/376,305, Notice of Allowance dated Jun. 30, 2020", 7 pgs.

"U.S. Appl. No. 16/376,305, Response filed Apr. 24, 2020 to Non Final Office Action dated Feb. 21, 2020", 10 pgs.

"U.S. Appl. No. 16/376,408, Examiner Interview Summary dated Jun. 2, 2020", 4 pgs.

"U.S. Appl. No. 16/376,408, Non Final Office Action dated Apr. 29, 2020", 12 pgs.

"U.S. Appl. No. 16/376,408, Notice of Allowance dated Aug. 3, 2020".

"U.S. Appl. No. 16/376,408, Response filed May 28, 2020 to Non Final Office Action dated Apr. 29, 2020", 11 pgs.

Brown, Nigel, "The Overlay File System", [Online]. Retrieved from the Internet: <URL: https://windsock.io/the-overlay-filesystem/>, (May 22, 2015), 5 pgs.

Heiner, Andreas P., et al., "Secure Software Installation in a Mobile Environment", (Jun. 18-20, 2007), pp. 155-156.

U.S. Appl. No. 16/376,277, filed Apr. 5, 2019, Multitenancy Using an Overlay File System.

U.S. Appl. No. 16/376,305, filed Apr. 5, 2019, Software Installation Through an Overlay File System.

U.S. Appl. No. 16/376,408 U.S. Pat. No. 10/809,994, filed Apr. 5, 2019, Declarative Multi-Artefact Software Installation.

U.S. Appl. No. 16/376,351, filed Apr. 5, 2019, Multitenant Application Server Using a Union File System.

* cited by examiner

FORMAT FOR MULTI-ARTEFACT SOFTWARE PACKAGES

TECHNICAL FIELD

This document generally relates to systems and methods for software installations. More specifically, this document relates to a declarative multi-artefact software installation.

BACKGROUND

Cloud-based software applications typically are installed on application servers by software developers. This is typically performed by the software developer for a particular software application creating an installation package that includes an application binary (the executable of the actual software application itself), an installer executable, and one or more software artefacts. A software artefact is a tangible outcome or effect of the software development process, and typically comes in the form of a file that includes information that will be used to create a certain state for the software application once it is installed. This may include, for example, files including some sort of content to be included or used in the software application, such as database entries, schemas, static file content, Docker™ images. It should be noted that some programmers consider the application binary itself to also be a software artefact, and for purposes of this disclosure the meaning of the term "artefact" will be used to cover the application binary itself as well.

The installer executable included in the software package is created by the software developer, and as such each software package winds up having its own individually programmed installer executable. This is wasteful, as many applications have similar requirements for the installation procedure, and yet each application must have its own installer executable re-implemented from scratch. Additionally, this makes the system error prone, as the additional work required to create individualized installer executable increases the likelihood that an error will be introduced into the system. Additionally, each installer executable must deal with many different potential configurations of target systems, which some programmers may not be familiar with, especially if they are new to the application server.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a solution is used to provide for a highly efficient application installer. A software packaging format, known as vSolution, is provided that allows software developers to ship multiple artefacts of different types in a single container. Unlike traditional mechanisms, this container does not contain a dedicated installer executable or any sort of installation routine. Rather, the container format encourages a declarative approach to describe what an installation routine should perform, via the organization of the artefacts based on content type and using a naming convention.

At the application server, a "universal" installation procedure is implemented that has dedicated handlers for each artifact type. The "author" of the application server software is able to create these dedicated handlers and identify the names that should be used to identify content to be handled by each handler. The "author" of the individual software package to be installed then organizes the installation content into folders based on these names.

The term "author" shall be interpreted broadly to mean any person, group of people, or entity that creates software. In the case of application server software, the software is typically part of a software framework that provides facilities to create web applications and a server environment to run those applications. Applicant server frameworks contain a comprehensive software layer model. The application server acts as a set of components accessible to a software developer through an Application Program Interface (API) defined for the platform itself. As such, the "author" of the application server software often is also the provider of the server itself, but that is not always necessarily the case.

The individual software packages to be installed are then created by their own "authors", also being a person, group of people, or entity that acts to create the packages. In an example embodiment, the installation package for software to be installed on the application server is stored in a container. Software containers are a form of operating system virtualization where a running container includes a minimum amount of operating system resources, memory, and/or services required to run an application. An example of software containers are Docker™ containers. Docker™ provides a common toolset, packaging model, and deployment mechanism to simplify the containerization and distribution of applications.

Figure 1:
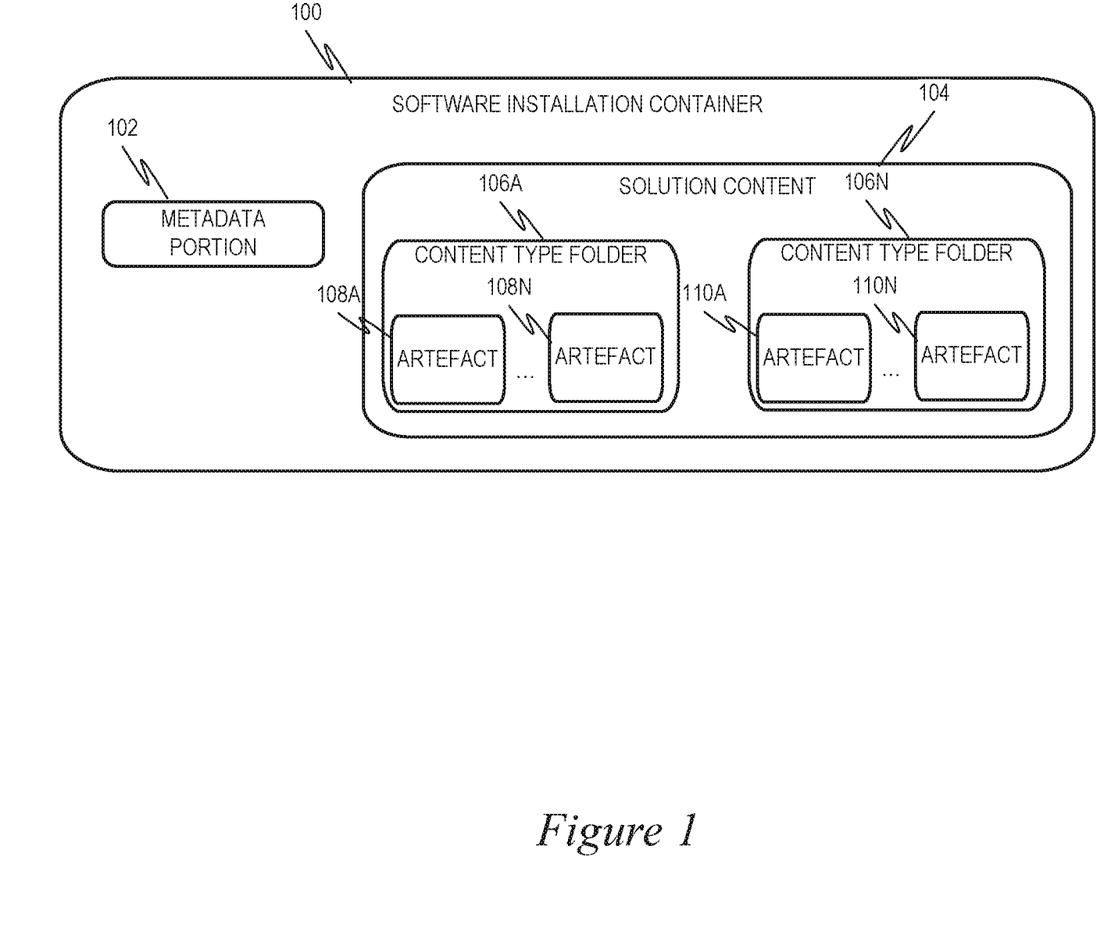
FIG. 1 is a diagram illustrating an example software installation container in accordance with an example embodiment.

FIG. 1 is a diagram illustrating an example software installation container 100 in accordance with an example embodiment. Each software application to be installed will have its own software installation container 100, created by the author of the software application. The software installation container 100 contains a metadata portion 102. The metadata portion 102 contains metadata about the software application corresponding to the software installation container 100. This metadata may include the name of the software application, the version number of the software application, an identification of the author of the software application, and a list of software installation container dependencies (if any). This list of software installation container dependencies identifies other software installation containers that need to be installed prior to this particular software installation container 100. For example, if the software installation container 100 is a patch or plug-in for a word processing program, this metadata portion 102 of the software installation container 100 may indicate a dependency on another software installation container corresponding to the word processing program, indicating that the word processing program needs to have been installed prior to the patch or plug-in.

The software installation container 100 also contains solution content 104. This solution content 104 includes one or more content type folders 106A-106N. Each content type folder 106A-106N corresponds to a different content type to be included in the installation. The different content types are defined at the application-server level, such that an application server will, as will be seen, define a number of different content types and names corresponding to those content types, as well as corresponding content type handlers. This provides flexibility to the author of the application server software to incorporate custom or unique content types. As will be seen later in this disclosure, the content type folders 106A-106N are each named in accordance with a preset name or naming convention defined by the application server software author. The individual software author creating the software installation container 100 uses these names or naming conventions when creating the content type folders 106A-106N.

Each artefact of a particular content type is stored in the folder 106A-106N corresponding to that content type. Thus, artefacts 108A-108N are of content type 1 (stored in content type folder 106A), while artefacts 110A-110N are of content type N (stored in content type folder 106N).

Notably absent from this software installation container 100 is any sort of installation executable. What this means is that the individual software author did not need to create a dedicated installation program to install the software. As described earlier, such dedicated installation programs typically rely on the software application author having detailed knowledge about the types of operating systems on which the software application will be installed and the underlying installation requirements of those operating systems. They also then rely on the software application author taking the time to actually create an installation executable to include with the software installation package. Providing a mechanism for the software application author to create an installation package without an installation executable thus eliminates those drawbacks.

The software installation container 100 may be stored in serialized and compressed format, such as a tar.gz file. A tar.gz file, also known as a tar file or a tarbal, is a collection of files. The archive data sets created by tar programs contain various file system parameters, such as name, time stamps, ownership, file access permissions, and directory organization.

Figure 2:
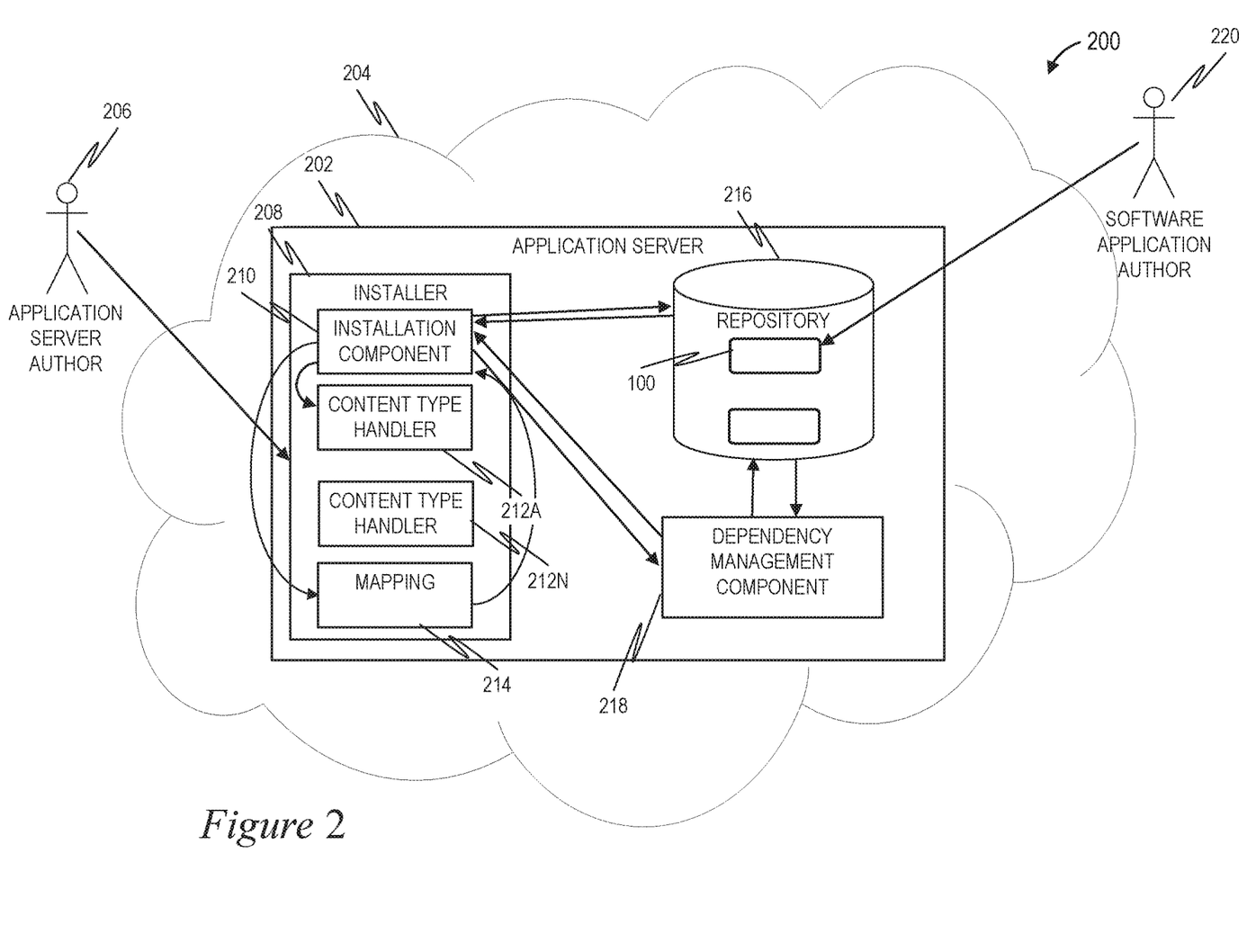
FIG. 2 is a block diagram illustrating a system for installing a software installation container, such as the software installation container of FIG. 1, in accordance with an example embodiment.

FIG. 2 is a block diagram illustrating a system 200 for installing a software installation container, such as the software installation container 100 of FIG. 1, in accordance with an example embodiment. An application server 202 operates in a cloud 204 within the system 200. The application server author 206 creates an installer 208. This installer 208 acts to install software installation containers. The installer 208 contains an installation component 210, which may be viewed as a universal installation component as it is capable of installing software installation containers of many different types and sources. The installer 208 also includes a series of content type handlers 212A-212N, each content type handler 212A-212N defining how content of a corresponding type should be installed. The installer 208 also includes a mapping 214 between content type names and content type handlers, which can be referred to when determining which content type handler to use to install content corresponding to a particular content type name.

The application server 202 further includes a repository 216 of software installation containers, such as the software installation container 100 of FIG. 1. When a software developer creates a software installation container 100 corresponding to a particular software application, he or she may access (either directly or indirectly) the mapping 214 to determine the available content type names for this application server 202. Any content type name contained within the mapping 214 would have a corresponding content type handler 212A-212N and therefore would be an available content type name. The software developer then organizes the software artefacts for the software application (including the application binary) into one or more of the folders 106A-106N in the software installation container 100 corresponding to the appropriate content types. Thus, for example, any executables may be stored in a "file" folder, while any database tables may be stored in a "database" folder. The software developer also then stores the corresponding metadata in the metadata portion 102 of the software installation container 100. At that point, the software developer can upload the software installation container 100 to the repository 216 for storage.

At installation time, the installer 208 may be activated in order to install a particular software installation container 100 stored in the repository 216. Prior to the actual installation beginning, first the metadata may be validated. This validation can include dependency and non-dependency validation routines. The dependency validation routines ensure that any dependencies should be resolved. Specifically, a dependency management component 218 retrieves the metadata stored in the metadata portion 102 of the retrieved software installation container 100. This metadata, as described earlier, identifies any other software installation containers that the retrieved software installation container 100 depends on. The dependency management component 218 then resolves these dependencies to determine an installation order for one or more of the software installation containers in the repository 216. In a simple case, the retrieved software installation container 100 may identify a single other software installation container that it depends on, with that other software installation container not identifying any dependencies of its own. In this case, the dependency management component 218 determines whether or not the other software installation container has already been installed and, if it has not, installs it prior to installing the retrieved software installation container 100. In more complicated cases, the other software installation containers on which the retrieved software installation container 100 depends contain dependencies of their own. In this case, the dependency management component 218 may create a dependency graph with each node in the graph representing a different software installation container and the edges between the nodes representing dependencies. This graph may then be traversed to determine an ordering of installation of the software installation containers that will not violate any of the dependencies.

Once all the other software installation containers on which the retrieved software installation container 100 depends have been installed, the installer 208 may execute the installation component 210, which performs the actual installation, assuming the metadata has otherwise been validated. Specifically, the non-dependency validation routines may be executed to ensure that the metadata is valid in other, non-dependency-related, aspects. These other aspects may include, for example, validating that a database schema is correct, file names and other text are in proper format, and scanning for malicious code. These non-dependency validation routines may be executed prior to, in parallel with, or subsequent to the dependency validation routines. Once both the non-dependency validation routines and the dependency validation routines have been completed, the installer 208 may proceed to executing the installation component 210 to perform the actual installation.

This involves parsing the content stored in the content type folders 106A-106N and, for each piece of content, using the mapping 214 to identify the content type handler 212A-210N corresponding to the name of the content type folder 106A-106N in which the piece of content is stored. Then, the piece of content may be passed to the corresponding content type handler 212A-212N to perform the installation of the piece of content based one or more procedures outlined in the corresponding content type handler 212A-212N.

It should be noted that while this figure only depicts two content type handlers 212A-212N, in example embodiments there may be any number of content type handlers and, in fact, there would typically be more content type handlers 212A-212N than there are content type folders 106A-106N in any particular container (or at least the same number of content type handlers as content type folders). This would permit each content type folder 106A-106N to map to a different unique content type handler 212A-212N.

In an example embodiment, the application server author 206 creates not just the installation component 210, which comprises a series of procedures executable to handle installation of software installation containers, but also creates the content type handlers 212A-212N and the mapping 214. The application server author 206 may create a different content type handler 212A-212N for each content type the application server author 206 sees as possibly being installed on the application server 202. This may be based on the application server author's 206 own knowledge of the types of software that will be installed on the application server 202 as well as the capabilities of the application server 202 itself and the cloud 204 environment in which it operates. For example, the application server 202 may not be capable of handling certain types of data due to processing and network bandwidth limitations, and in such cases the application server author 206 may deliberately exclude content type handlers for those certain types of data (as well as omitting the corresponding content types from the mapping 214).

Figure 3:
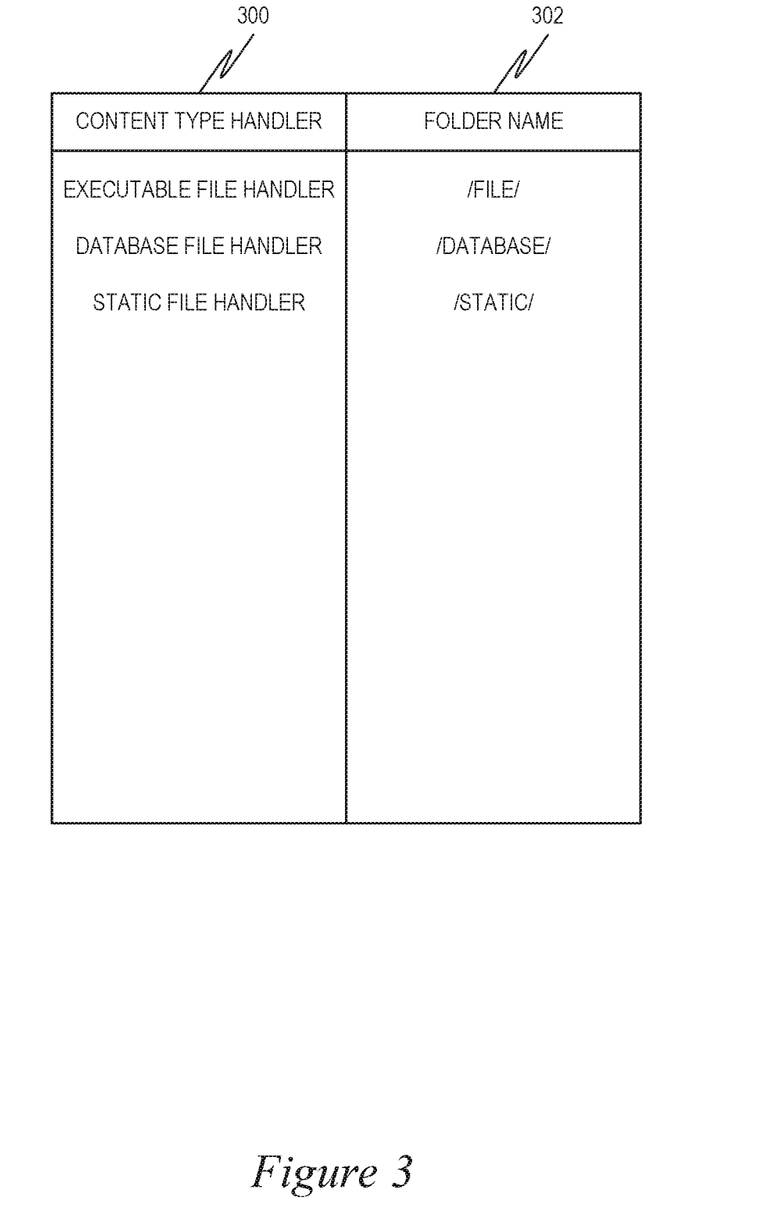
FIG. 3 is a diagram illustrating a mapping in accordance with an example embodiment.

FIG. 3 is a diagram illustrating a mapping 214 in accordance with an example embodiment. This depicts a simple mapping 214 comprising a table of two columns 300, 302. In some example embodiments a more sophisticated mapping 214 may be used to reduce storage requirements or increase access speed. Column 300 contains folder names corresponding to different content types. Column 302 contains content type handler identifications. The presence of a particular folder name in column 300 of a particular row and a particular content type handler identification in column 302 of that same particular row identifies the particular folder name as being mapped to the particular content type handler identification. Thus, when the installation component 210 accesses the mapping 214 to identify the content type handler to use to handle data in a particular folder, it will look up the corresponding folder name in column 300 and then retrieve the content type handler identification in that same row. The content type handler identification is then used to access the appropriate content type handler.

Examples of more sophisticated mapping 214 data structures include hash tables or other encoded data structures.

Since the application server author 206 creates the mapping 214, the application server author 206 is essentially in control of the naming convention used for the folders. Thus, the mapping 214 will contain the exact name that is to be used for a folder name for a folder containing content of a particular type. In that way, the software application author 220 can access this mapping 214 when creating the software installation container 100 to obtain the folder names with which to create the corresponding folders. Alternatively, these names may be communicated to the software application author 220 via a different mechanism, such as through a "requirements" summary provided to the software application author 220 providing a description of the requirements of installing software on the application server 202.

In an example embodiment, the content type handlers 212A-212N implement a common interface:

Install(context, content)=>result

The context value contains information about the installation context, such as the name and version of the installed software package. The content variable contains the serialized software package content. The corresponding content type handlers 212A-212N implement specific logic to install the provided artefacts to the system, as defined by the application server author 206. For example, a content type handler that handles the installation of file artefacts would copy the files contained in the corresponding folder to the hard drive. A content type handler that handles the installation of database artifacts, however, would create the database entities contained in the corresponding folder (e.g., tables, views, stored procedures).

The process permits a software packaging format that allows multiple artefacts of different types to be handled without using dedicated installation routines for each software package. The installation procedure is implemented only in the target application server and not in the individual software packages. This frees the software application author 220 from having to deal with many different configurations of target systems. Indeed, the software application author 220 need not even have knowledge or understanding of how the application server 202 will actually handle installation of the content types.

In an example embodiment, the above techniques may be applied in a data hub environment. A data hub environment is a cloud-based solution that provides graphical user interface-based data pipeline capabilities to integrated data among and between various data platforms. The data hub environment can integrate this data without requiring it to be moved, and can store the summarized aggregated data in an in-memory database. In such an environment, the software installation containers described earlier can have one of many different uses for software containers, which may be implemented as, for example, Docker™ containers. Kubernetes orchestration technologies can be used to deploy the docket containers.

Docker™ is a tool for creating, deploying, and running applications using containers. Kubernetes is a container orchestration system for automating application deployment, scaling, and management.

Figure 4:
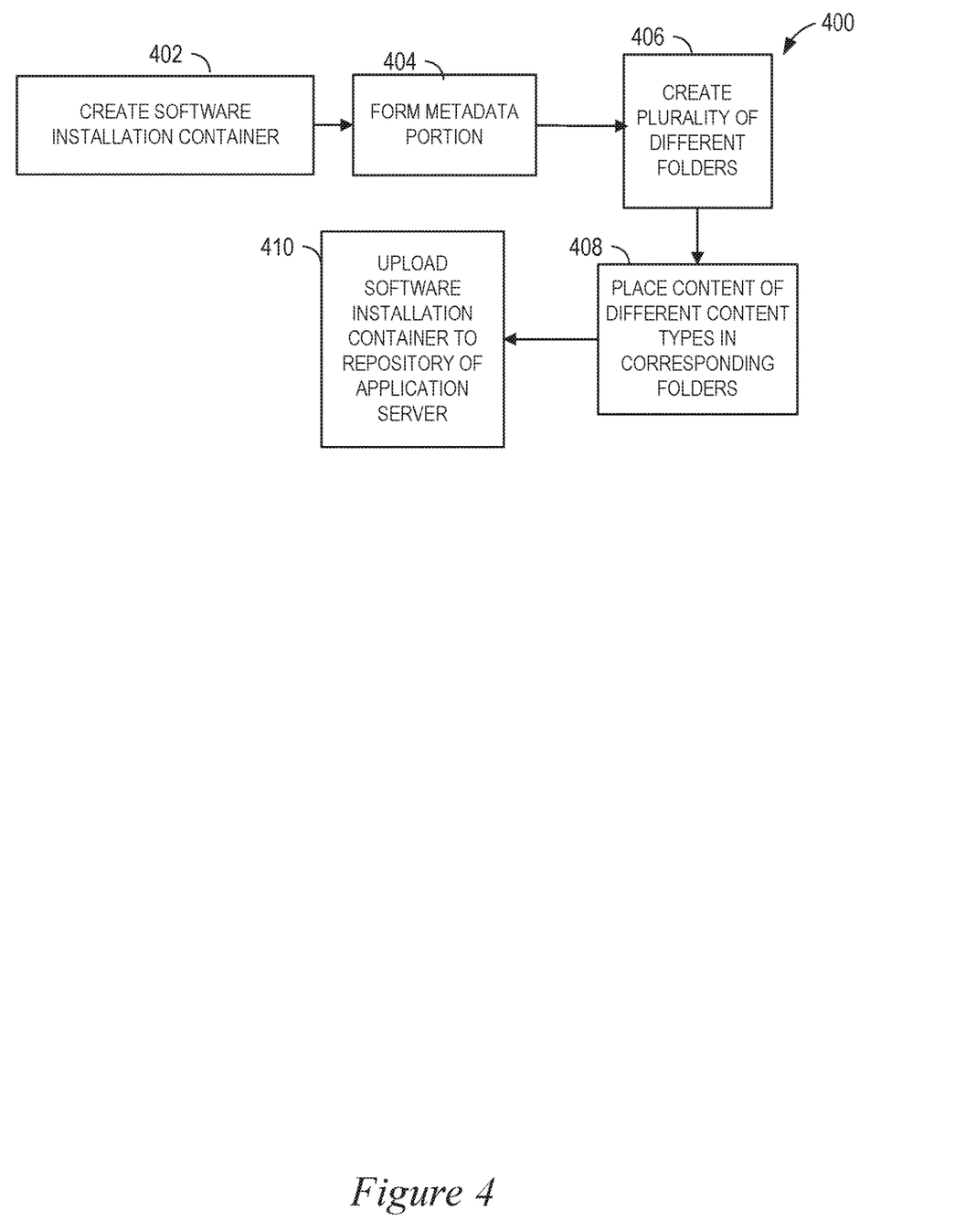
FIG. 4 is a flow diagram illustrating a method for causing installation of a software application on an application server in accordance with an example embodiment.

FIG. 4 is a flow diagram illustrating a method 400 for causing installation of a software application on an application server in accordance with an example embodiment. At operation 402, a software installation container is created for a software application. At operation 404, a metadata portion of the software installation container is formed. The metadata portion contains information about the software application. This may include dependency information specifying one or more dependencies among the software application and one or more additional software applications. In an example embodiment, these dependencies are provided in list format, with each dependency specified as an identification of the other software application or applications on which the software application corresponding to the software installation container depend(s).

At operation 406, a plurality of different folders are created in the software installation container. Each folder corresponds to a different content type and has a name in compliance with a naming convention specified by an application server software. In some example embodiments, the naming convention is an explicitly provided name that corresponds to the content type at issue, while in other example embodiments, the naming convention is a set of rules or constraints indicating how the folder(s) should be named. The naming convention may be specified, for example, in a mapping.

At operation 408, content of multiple different content types pertaining to the software application is stored in the folders corresponding to respective content types in the software installation container. This content may be software artefacts required for installation of the software application.

At operation 410, the software installation container, which lacks an installation executable, may be uploaded to a repository of an application server running the application server software for installation.

Figure 5:
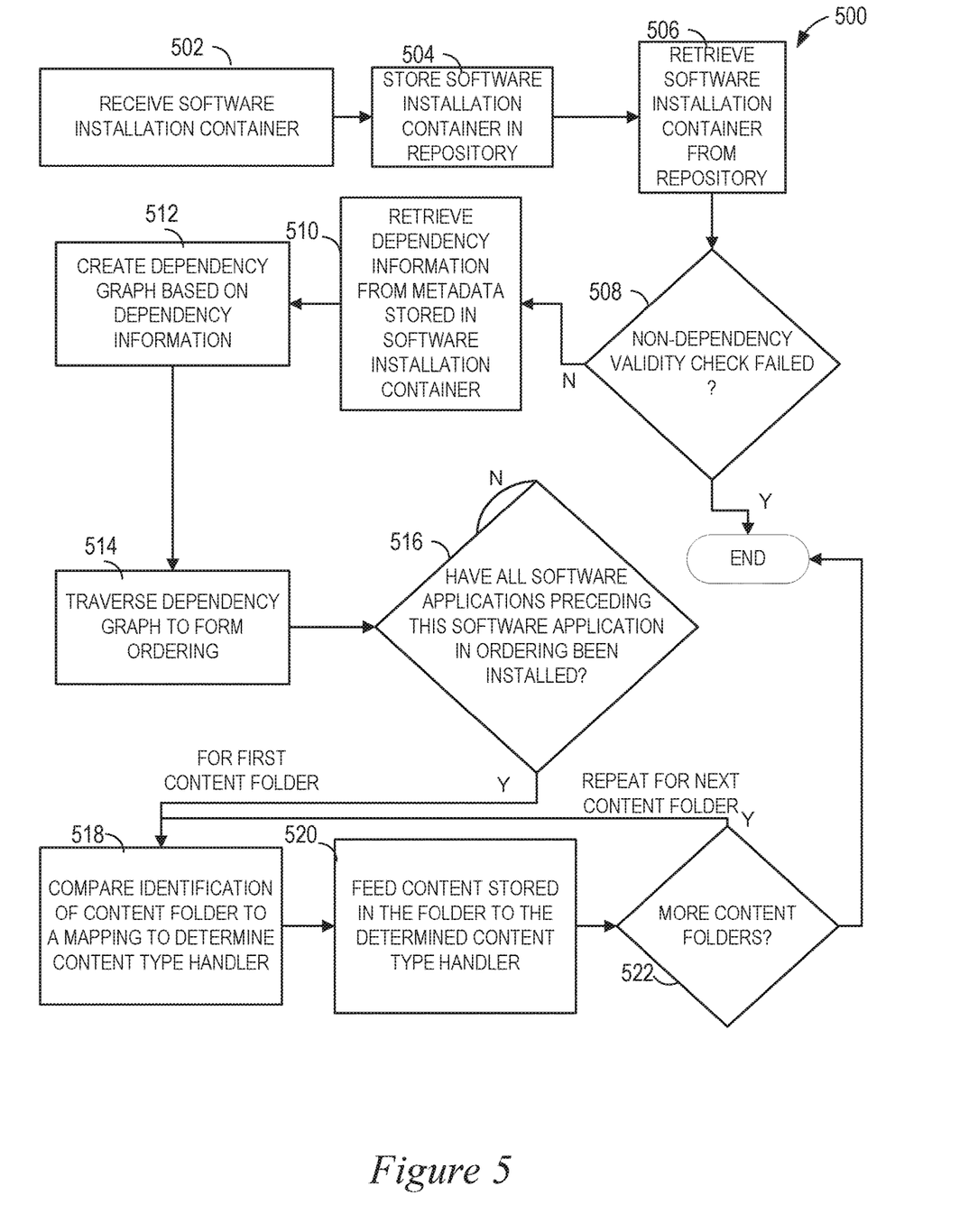
FIG. 5 is a flow diagram illustrating a method for installing a software application on an application server in accordance with an example embodiment.

FIG. 5 is a flow diagram illustrating a method 500 for installing a software application on an application server in accordance with an example embodiment. At operation 502, a software installation container for a software application is received at the application server. The software application container includes metadata and a plurality of content folders, each content folder containing a different type of content, but lacks an installation executable.

At operation 504, the software installation container is stored in a repository. In some example embodiments the repository is stored on the application server itself, while in other example embodiments the repository is a separate component accessible to the application server.

At this point, an installation component on the application server can be executed. The installation component is not customized for this particular software installation container but rather is able to install software applications stored in many different software installation containers. At operation 506, the software installation container is retrieved from the repository.

At operation 508, a non-dependency validation check is performed on the software installation container. This may include, for example, validating that a database schema is correct and file names and other text are in proper format, and scanning for malicious code. If the non-dependency validation check fails, then the method 500 ends and the software application cannot be installed.

Otherwise, at operation 510, dependency information specifying one or more dependencies among the software application and one or more other software applications is retrieved from the metadata stored in the software installation container. Then, at operation 512, a dependency graph is created based on the dependency information. At operation 514, the dependency graph is traversed to form an ordering of software applications to be installed. At operation 516, it is determined if all software applications earlier in the ordering than the software application corresponding to the software application container have been installed. If not, then the method 500 does not proceed with installing the software application until they are.

Once all software applications earlier in the ordering than the software application corresponding to the software application container have been installed, then a loop is begun for each content folder in the plurality of content folders in the software installation container. At operation 518, an identification (such as the name) of the content folder is compared to a mapping to determine a content type handler corresponding to content of a type stored in the content folder. This may include using an identification of the content type handler stored in the mapping to identify a location of the content type handler on the application server. At operation 520, content stored in the folder is fed to the determined content type handler. The determined content type handler executes operations defined in the determined content type handler to install content of the type stored in the current folder on the application server.

At operation 522, it is determined if there are any more content folders in the plurality of content folders. If not, then the method 500 ends. If so, however, then the method 500 loops back to operation 518 for the next content folder in the plurality of content folders.

Figure 6:
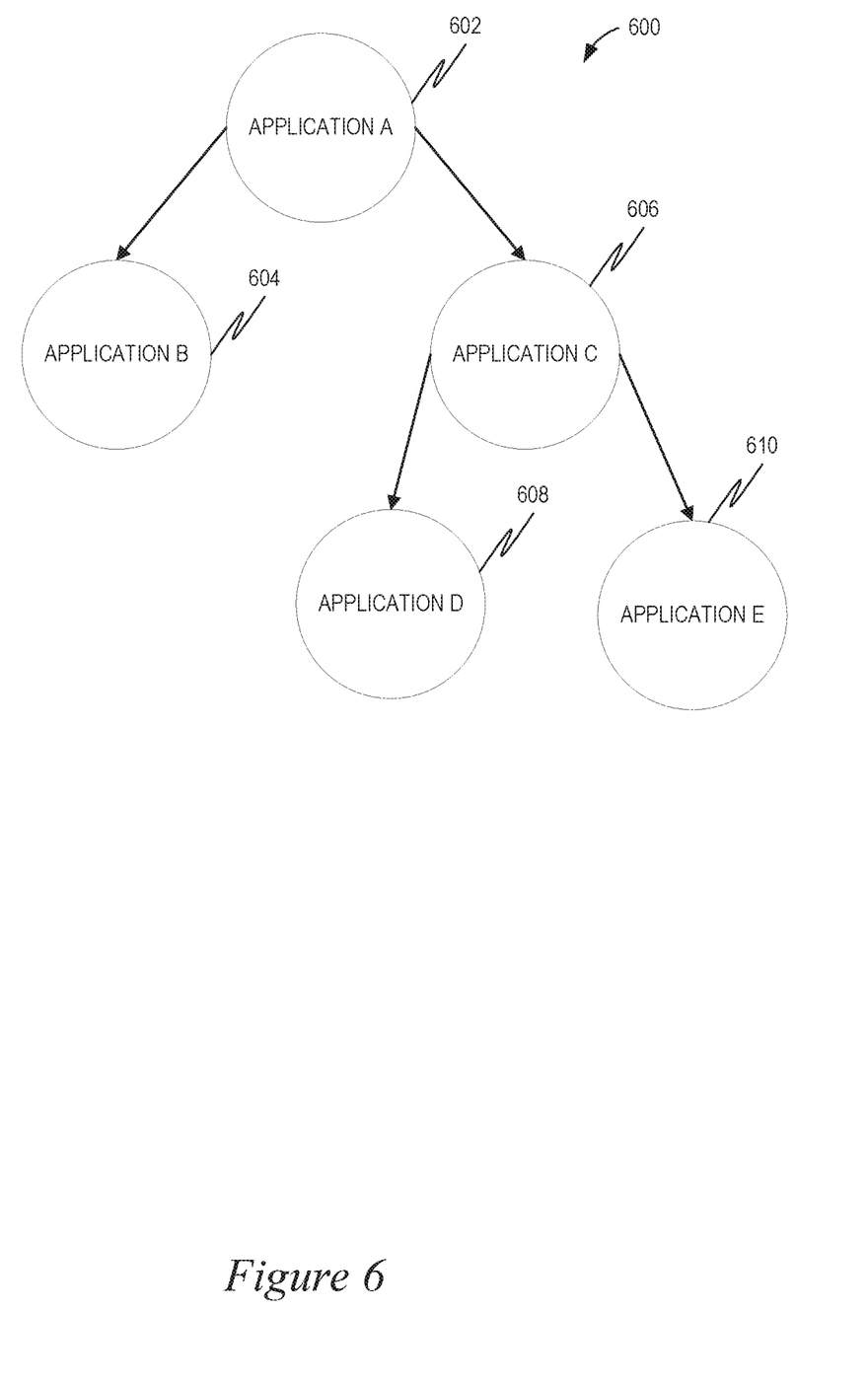
FIG. 6 is an example of a dependency graph in accordance with an example embodiment.

FIG. 6 is an example of a dependency graph 600 in accordance with an example embodiment. Here, application A 602 is dependent on both application B 604 and application C 606. Application C 606 is itself dependent on applications D and E. This dependency graph 600 may have been formed from metadata retrieved from a software installation container for application A (which may have indicated that application A was dependent on application B and application C) and from metadata retrieved from a software installation container for application C (which may have indicated that application C was dependent on application D and application E). The metadata in the software installation containers for application B, application D, and application E may have listed no dependencies. Here the dependency graph 600 is constructed as a directed graph, as the edges are unidirectional and indicate a dependency on the node at the end of the edge by the node at the beginning of the edge.

Once the dependency graph 600 has been formed, it can be traversed at any stage to obtain an ordering. The ordering may be the inverse of the traversal route if the route begins with the top node in the graph and works its way down through each of the paths. For example, a common traversal route might be to start at application A 602, progress to application B 604, and then, since that is a dead end, progress back up and then down to application C 606, then to application D 608, and then, since that is a dead end, progress back up and then down to application E 610 and then end since that is a dead end and no more nodes are left to be traversed. As such, the traversal route was application A 602, application B 604, application C 606, application D

608, application E 610. The reverse of this route, and hence the ordering, would be E, D, C, B, A. Thus, if the system were looking to install application A, it would need to wait until applications B, C, D, and E were all installed first before proceeding.

EXAMPLES

Example 1

A system comprising:
at least one hardware processor; and
a computer-readable medium storing instructions that, when executed by the at least one hardware processor, cause the at least one hardware processor to perform operations comprising:
creating a software installation container for a software application;
forming a metadata portion of the software installation container, the metadata portion containing information about the software application;
storing content of multiple different content types in the software installation container, the content stored in a plurality of folders in the software installation container, each folder storing content of a different content type, each folder having a name in compliance with a naming convention specified by an application server software; and
uploading the software installation container to a repository of an application server running the application server software, the software installation container lacking an installation executable.

Example 2

The system of claim Example 1, wherein the metadata includes dependency information specifying one or more dependencies among the software application and one or more other software applications.

Example 3

The system of Examples 1 or 2, wherein the multiple different content types include an executable content type.

Example 4

The system of any of Examples 1-3, wherein the multiple differ content types include a database content type.

Example 5

The system of any of Examples 1-4, wherein the multiple different content types include a container image type.

Example 6

The system of any of Examples 1-5, wherein the naming convention is identified by accessing a mapping stored at the application server, the mapping specifying folder names for each of the plurality of different content types.

Example 7

The system of any of Examples 1-6, wherein the application server is located in a cloud environment.

Example 8

A method comprising:
creating a software installation container for a software application;
forming a metadata portion of the software installation container, the metadata portion containing information about the software application;
storing content of multiple different content types in the software installation container, the content stored in a plurality of folders in the software installation container, each folder storing content of a different content type, each folder having a name in compliance with a naming convention specified by an application server software; and
uploading the software installation container to a repository of an application server running the application server software, the software installation container lacking an installation executable.

Example 9

The method of Example 8, wherein the metadata includes dependency information specifying one or more dependencies among the software application and one or more other software applications.

Example 10

The method of Examples 8 or 9, wherein the multiple different content types include an executable content type.

Example 11

The method of any of Examples 8-10, wherein the multiple different content types include a database content type.

Example 12

The method of any of Examples 8-11, wherein the multiple different content types include a container image type.

Example 13

The method of any of Examples 8-12, wherein the naming convention is identified by accessing a mapping stored at the application server, the mapping specifying folder names for each of the plurality of different content types.

Example 14

The method of any of Examples 8-13, wherein the application server is located in a cloud environment.

Example 15

A non-transitory machine-readable medium storing instructions which, when executed by one or more processors, cause the one or more processors to perform operations comprising:
creating a software installation container for a software application;
forming a metadata portion of the software installation container, the metadata portion containing information about the software application;
storing content of multiple different content types in the software installation container, the content stored in a plurality of folders in the software installation container, each folder storing content of a different content type, each folder having a name in compliance with a naming convention specified by an application server software; and uploading the software installation container to a repository of an application server running the application server software, the software installation container lacking an installation executable.

Example 16

The non-transitory machine-readable medium of Example 15, wherein the metadata includes dependency information specifying one or more dependencies among the software application and one or more other software applications.

Example 17

The non-transitory machine-readable medium of Examples 15 or 16, wherein the multiple different content types include an executable content type.

Example 18

The non-transitory machine-readable medium of any of Examples 15-17, wherein the multiple different content types include a database content type.

Example 19

The non-transitory machine-readable medium of any of Examples 15-18, wherein the multiple different content types include a container image type.

Example 20

The non-transitory machine-readable medium of any of Examples 15-19, wherein the naming convention is identified by accessing a mapping stored at the application server, the mapping specifying folder names for each of the plurality of different content types.

Figure 7:
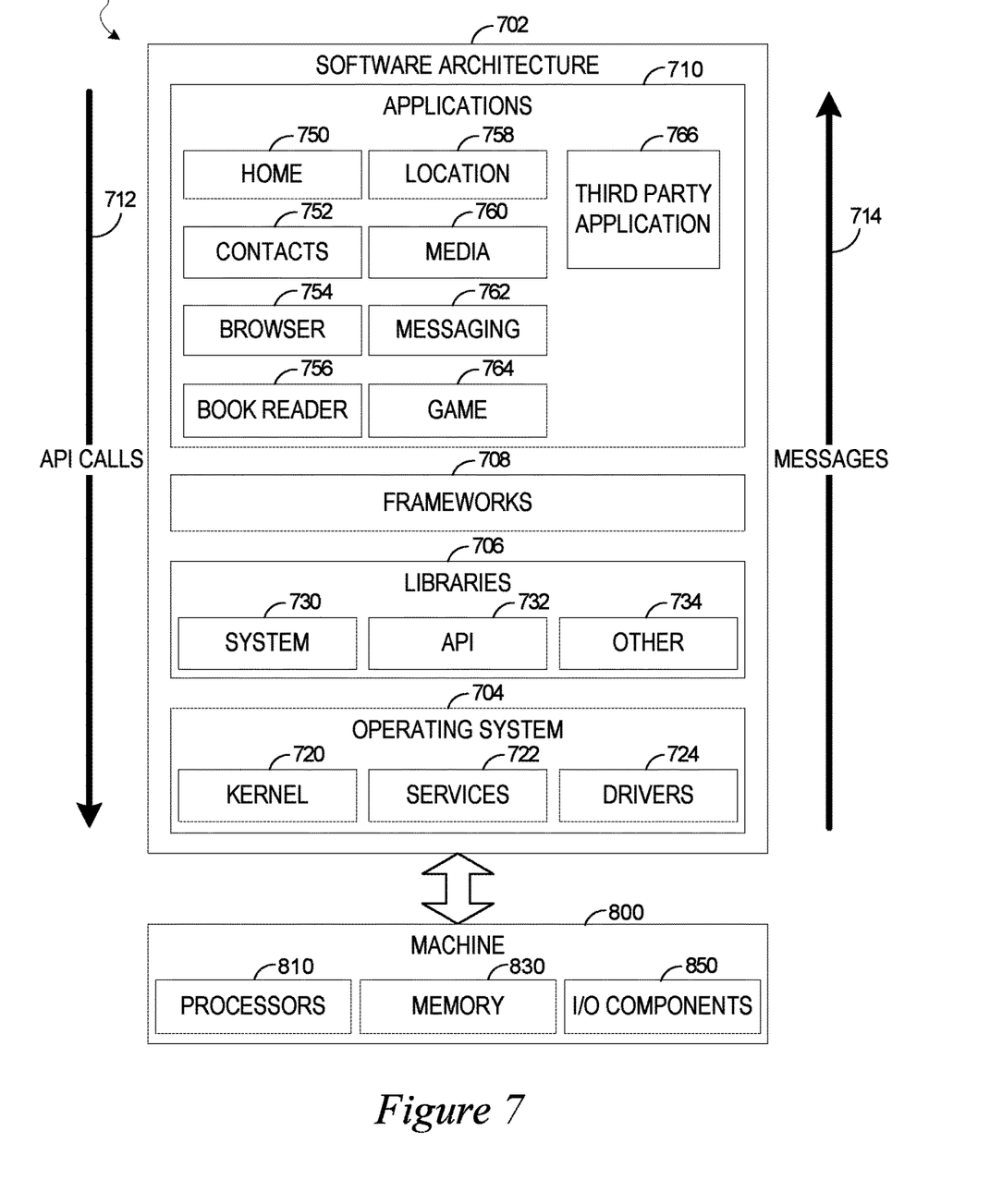
FIG. 7 is a block diagram illustrating an architecture of software, which can be installed on any one or more of the devices described above.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and input/output (I/O) components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
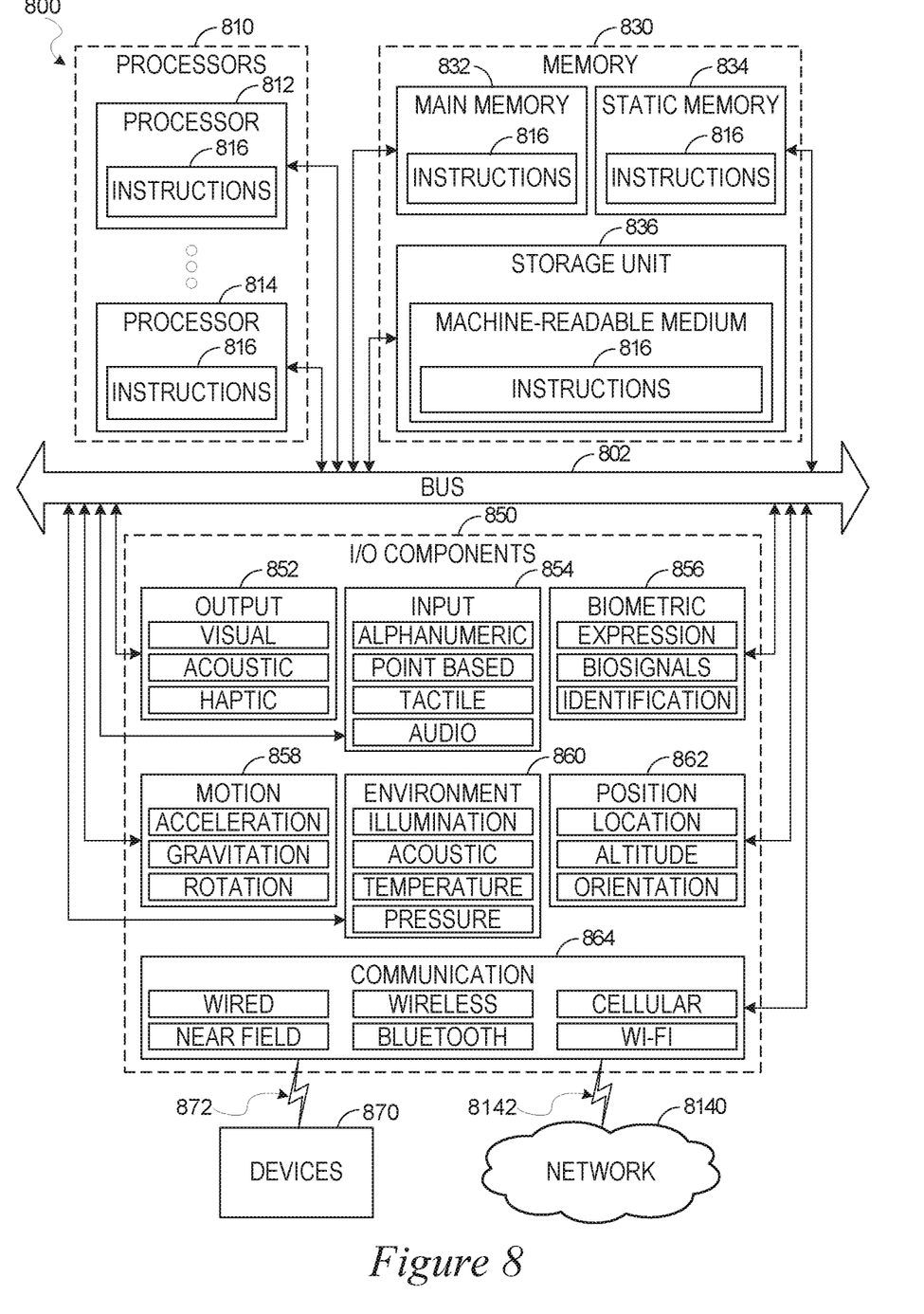
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 600 of FIG. 6. Additionally, or alternatively, the instructions 816 may implement FIGS. 1-5 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to induce multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 8140 or devices 870 via a coupling 8142 and a coupling 872, respectively. For example, the communication components 864 may include a network interface component or another suitable device to interface with the network 8140. In further examples, the communication components 864 may include wired communication components, wireless communication components, cellular communication components, near field communication (NEC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g, the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors 810. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 8140 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 8140 or a portion of the network 8140 may include a wireless or cellular network, and the coupling 8142 may be a Code Division Multiple Access (CDMA) connection, a Global System for Mobile communications (GSM) connection, or another type of cellular or wireless coupling. In this example, the coupling 8142 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 8140 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   creating a software installation container for a software application;
   forming a metadata portion of the software installation container, the metadata portion containing information about the software application;
   storing content of multiple different content types in the software installation container, the content stored in a plurality of folders in the software installation container, each folder storing content of a different content type, each folder having a name in compliance with a naming convention specified by an application server software; and uploading the software installation container to a repository of an application server running the application server software, the software installation container does not contain routines or an installation executable to install the software application, the uploaded software installation container capable of being used by an installation component of the application server to install the software application, the installation component capable of using a plurality of different uploaded software installation containers to install a plurality of different software applications based on the metadata portion and the naming convention.

2. The system of claim 1, wherein the metadata includes dependency information specifying one or more dependencies among the software application container and one or more other software application containers.

3. The system of claim 1, wherein the multiple different content types include an executable content type.

4. The system of claim 1, wherein the multiple different content types include a database content type.

5. The system of claim 1, wherein the multiple different content types include a container image type.

6. The system of claim 1, wherein the naming convention is identified by accessing a mapping stored at the application server, the mapping specifying folder names for each of the plurality of different content types.

7. The system of claim 1, wherein the application server is located in a cloud environment.

8. A method comprising:
creating a software installation container for a software application;
forming a metadata portion of the software installation container, the metadata portion containing information about the software application;
storing content of multiple different content types in the software installation container, the content stored in a plurality of folders in the software installation container, each folder storing content of a different content type, each folder having a name in compliance with a naming convention specified by an application server software; and
uploading the software installation container to a repository of an application server running the application server software, the software installation container does not contain routines or an installation executable to install the software application, the uploaded software installation container capable of being used by an installation component of the application server to install the software application, the installation component capable of using a plurality of different uploaded software installation containers to install a plurality of different software applications based on the metadata portion and the naming convention.

9. The method of claim 8, wherein the metadata includes dependency information specifying one or more dependencies among the software application container and one or more other software application containers.

10. The method of claim 8, wherein the multiple different content types include an executable content type.

11. The method of claim 8, wherein the multiple different content types include a database content type.

12. The method of claim 8, wherein the multiple different content types include a container image type.

13. The method of claim 8, wherein the naming convention is identified by accessing a mapping stored at the application server, the mapping specifying folder names for each of the plurality of different content types.

14. The method of claim 8, wherein the application server is located in a cloud environment.

15. A non-transitory machine-readable medium storing instructions which, when executed by one or more processors, cause the one or more processors to perform operations comprising:
creating a software installation container for a software application;
forming a metadata portion of the software installation container, the metadata portion containing information about the software application;
storing content of multiple different content types in the software installation container, the content stored in a plurality of folders in the software installation container, each folder storing content of a different content type, each folder having a name in compliance with a naming convention specified by an application server software; and
uploading the software installation container to a repository of an application server running the application server software, the software installation container does not contain routines or an installation executable to install the software application, the uploaded software installation container capable of being used by an installation component of the application server to install the software application, the installation component capable of using a plurality of different uploaded software installation containers to install a plurality of different software applications based on the metadata portion and the naming convention.

16. The non-transitory machine-readable medium of claim 15, wherein the metadata includes dependency information specifying one or more dependencies among the software application container and one or more other software application containers.

17. The non-transitory machine-readable medium of claim 15, wherein the multiple different content types include an executable content type.

18. The non-transitory machine-readable medium of claim 15, wherein the multiple different content types include a database content type.

19. The non-transitory machine-readable medium of claim 15, wherein the multiple different content types include a container image type.

20. The non-transitory machine-readable medium of claim 15, wherein the naming convention is identified by accessing a mapping stored at the application server, the mapping specifying folder names for each of the plurality of different content types.

* * * * *